(12) United States Patent
Gaylor

(10) Patent No.: US 7,831,833 B2
(45) Date of Patent: Nov. 9, 2010

(54) SYSTEM AND METHOD FOR KEY RECOVERY

(75) Inventor: Timothy R. Gaylor, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1427 days.

(21) Appl. No.: 10/908,318

(22) Filed: May 6, 2005

(65) Prior Publication Data

US 2006/0242415 A1   Oct. 26, 2006

Related U.S. Application Data

(60) Provisional application No. 60/594,604, filed on Apr. 22, 2005.

(51) Int. Cl.
H04L 9/32 (2006.01)
G06F 7/04 (2006.01)
H04L 9/00 (2006.01)

(52) U.S. Cl. .................. 713/176; 713/156; 713/158; 713/159; 713/165; 713/171; 713/172; 713/173; 713/175; 713/182; 713/183; 726/1; 726/2; 726/3; 726/4; 726/5; 726/6; 726/8; 726/9; 726/10; 726/18; 726/28; 380/277; 380/278; 380/286; 380/44; 380/47

(58) Field of Classification Search .............. 713/176, 713/156, 171, 173; 726/5–8, 18–19
See application file for complete search history.

(56) References Cited

U.S. PATENT DOCUMENTS

| | | | |
|---|---|---|---|
| 5,497,421 A * | 3/1996 | Kaufman et al. ............ | 713/156 |
| 5,923,756 A | 7/1999 | Shambroom | |
| 6,026,440 A | 2/2000 | Shrader et al. | |
| 6,088,451 A | 7/2000 | He et al. | |
| 6,160,891 A * | 12/2000 | Al-Salqan ................. | 380/286 |
| 6,219,669 B1 | 4/2001 | Haff et al. | |
| 6,243,816 B1 * | 6/2001 | Fang et al. ................ | 726/5 |
| 6,442,571 B1 | 8/2002 | Haff et al. | |
| 6,845,383 B1 | 1/2005 | Kraenzel et al. | |
| 6,880,002 B2 | 4/2005 | Hirschfeld et al. | |

(Continued)

FOREIGN PATENT DOCUMENTS

WO   WO-200451964 A2   6/2004

*Primary Examiner*—Christian Laforgia
*Assistant Examiner*—Jenise E Jackson
(74) *Attorney, Agent, or Firm*—Choate, Hall & Stewart, LLP

(57) ABSTRACT

A secure mechanism for transparent key recovery for a user who has changed authentication information is disclosed. A password manager agent intercepts requests by a user to access secure resources that require user credentials. Upon detecting changed authentication information for the user, the password manager agent automatically regenerates the components of a cryptographic key associated with the user that was previously used to encrypt user credentials for the user and then destroyed. After regeneration of the original cryptographic key, the password manager agent uses the key to decrypt the user credentials necessary for the requested application. The regenerated key is then destroyed and the user credentials are re-encrypted by the password manager agent using a new cryptographic key associated with the user made up of multiple components. Following the re-encryption of the user credentials, the components used to assemble the new key are securely stored in multiple locations and the new key is destroyed.

32 Claims, 8 Drawing Sheets

U.S. PATENT DOCUMENTS

| | | | |
|---|---|---|---|
| 6,947,556 B1 * | 9/2005 | Matyas et al. | 380/29 |
| 6,950,991 B2 | 9/2005 | Bloomfield et al. | |
| 7,085,834 B2 | 8/2006 | Delany et al. | |
| 7,103,772 B2 | 9/2006 | Jorgensen et al. | |
| 2001/0056541 A1 * | 12/2001 | Matsuzaki et al. | 713/193 |
| 2002/0078243 A1 | 6/2002 | Rich et al. | |
| 2002/0116642 A1 | 8/2002 | Joshi et al. | |
| 2002/0138572 A1 | 9/2002 | Delany et al. | |
| 2002/0184224 A1 | 12/2002 | Haff et al. | |
| 2003/0014368 A1 | 1/2003 | Leurig et al. | |
| 2003/0063119 A1 | 4/2003 | Bloomfield et al. | |
| 2003/0115452 A1 * | 6/2003 | Sandhu et al. | 713/155 |
| 2004/0042620 A1 * | 3/2004 | Andrews et al. | 380/286 |
| 2004/0049515 A1 | 3/2004 | Haff et al. | |
| 2004/0087304 A1 | 5/2004 | Buddhikot et al. | |
| 2004/0255154 A1 | 12/2004 | Kwan et al. | |
| 2005/0015601 A1 | 1/2005 | Tabi | |
| 2005/0027989 A1 * | 2/2005 | Sandhu et al. | 713/182 |
| 2005/0055570 A1 | 3/2005 | Kwan et al. | |
| 2005/0071652 A1 | 3/2005 | de Jong | |
| 2005/0086477 A1 * | 4/2005 | Lin et al. | 713/171 |
| 2005/0097062 A1 * | 5/2005 | Benaloh | 705/71 |
| 2005/0125663 A1 | 6/2005 | Funk | |
| 2005/0144481 A1 | 6/2005 | Hopen et al. | |
| 2005/0204362 A1 * | 9/2005 | Chatterjee et al. | 719/318 |
| 2005/0210263 A1 | 9/2005 | Levas et al. | |
| 2006/0004662 A1 | 1/2006 | Nadalin et al. | |
| 2006/0037066 A1 * | 2/2006 | Audebert | 726/5 |
| 2006/0161970 A1 | 7/2006 | Hopen et al. | |
| 2007/0107048 A1 | 5/2007 | Halls et al. | |
| 2007/0179955 A1 | 8/2007 | Croft et al. | |
| 2007/0192827 A1 | 8/2007 | Maxted et al. | |
| 2008/0022356 A1 * | 1/2008 | Tanaka et al. | 726/1 |
| 2008/0033960 A1 * | 2/2008 | Banks et al. | 707/9 |
| 2008/0034425 A1 | 2/2008 | Overcash et al. | |

\* cited by examiner

SYSTEM AND METHOD FOR KEY RECOVERY

CROSS REFERENCE TO RELATED APPLICATIONS

The present application claims the benefit of a United States provisional application filed Apr. 22, 2005, application No. 60/594,604, entitled "Key Management and Identity Verification".

FIELD OF THE INVENTION

The illustrative embodiment of the present invention relates generally to key recovery, and more particularly to transparent recovery of a key following the re-authentication of a user.

BACKGROUND OF THE INVENTION

Traditionally, access to applications and other resources available on a system or over a computer network has been controlled by requiring a user attempting to access the application or resource to provide authenticating information to the system prior to being granted access. While the mechanism of requiring the user to provide authentication for a resource worked adequately in situations where only a single resource was being requested, it still often required a user to authenticate twice, first for access to the system/network and then a second time for the requested resource. As the authentication information was often different for the resource than it was for the system (e.g. the system may require a first user ID/password combination from the user while the resource requires a second and different user ID/password combination) the requirement of providing the information was often felt to be aggravating or burdensome for the user. Additionally, as the number of secure resources requiring authentication that were available on the system or over the network increased, the required number of authentication attempts by the user also increased, thereby resulting in a corresponding increase in the user's aggravation level due to the increased number of authenticators.

In response to user dislike for frequent authentications, the concept of the single sign-on system was developed. In a single sign-on system, a password manager (a software application/agent/process/etc.) running on the network or system is responsible for providing user credentials to secure applications. The user credentials for a particular user are usually stored in encrypted form in a location accessible to the password manager after being encrypted using a cryptographic key associated with the user. Requests by an authenticated user to access a secure application which require a user credential are intercepted by the password manager.

FIG. 1 (prior art) depicts the sequence of steps followed by conventional single sign-on systems to decrypt a user credential in response to a request for a secure resource. The sequence begins when the user authenticates to the system or network (step 200). The authentication frequently takes the form of entering a User ID and domain password. A cryptographic key is generated (step 202) and associated with the user's authentication information. The cryptographic key is used to encrypt a user credential for a secure resource (step 204). The cryptographic key is then stored. Subsequently a user requests access to a secure resource requiring the encrypted user credential (step 206). An agent/process for the single sign-on system identifies the request and retrieves the cryptographic key associated with the user's authentication information (step 208). It is this retrieval step that fails if the authentication information has changed since the user credential was originally encrypted and that requires system administrator assistance. The storing of the intact cryptographic key also represents a distinct security threat as it is subject to misappropriation by malicious users on the system/network. Assuming a successful retrieval, the encrypted user credential is then decrypted using the cryptographic key (step 210) and the decrypted user credential is supplied to the secure resource (step 212).

The single-sign on concept thus allows the user to access secure applications or resources without having to re-authenticate with each request while still securely encrypting the credentials required to access secure applications.

Unfortunately, conventional single sign-on systems do not work well in the event a user changes the authentication information provided to the system/network during the user's initial authentication during log-on. For example, if a user has changed a password as a result of forgetting their old password, the password manager will often not be able to find the right cryptographic key associated with the user. Without the proper cryptographic key, the user credentials necessary to access the requested secure resource are not able to be decrypted and the user request to access the secure resource fails. A system administrator is required to decrypt the required user credential and update the cryptographic key and/or the information reviewed by the password manager. Additionally, the storing of an intact cryptographic key associated with the user represents a security vulnerability as the key could be stolen by malicious entities thereby exposing the user's credentials.

BRIEF SUMMARY OF THE INVENTION

The illustrative embodiment of the present invention provides a secure mechanism for transparent key recovery for a user who has changed authentication information. A password manager agent intercepts requests by a user to access secure resources that require user credentials. The password manager agent dynamically determines whether the identity of the requesting user has been validated using changed authentication information. In the event the user has accessed the system/network using changed authentication information, the password manager agent automatically regenerates the components of a cryptographic key associated with the user that was previously used to encrypt user credentials for the user and then destroyed. The individual components of the cryptographic key that are retrieved were originally generated using a variety of cryptographic techniques and are securely stored in at least two different locations. After regeneration of the cryptographic key, the password manager agent uses the regenerated key to decrypt the user credentials necessary for the requested application. The regenerated key is then destroyed and the user credentials are re-encrypted by the password manager agent using a new cryptographic key associated with the user generated from multiple components. Following the re-encryption of the user credentials, the components used to assemble the new key are securely stored in multiple locations and the new key is destroyed. The present invention thus allows transparent key recovery while protecting the user's credentials from the type of illicit use possible with a stored cryptographic key.

In one aspect, a method of providing access to a secure resource includes the steps of receiving a first authenticator for a user and the step of encrypting, using a first key, a user credential required for access to the secure resource in response to receipt of the first authenticator. The method further includes the steps of destroying the first key and receiving, subsequent to the destruction of the first key, a second authenticator used to authenticate the user. The method additionally includes the steps of receiving a request from the user to access the secure resource and the step of regenerating the first key following validation of the identity of the user. Also, the method decrypts the encrypted user credential using the regenerated first key and then provides the decrypted user credential to the requested resource. Following the decryption of the user credential using the regenerated first key, the present invention encrypts the user credential using a second key created following the receipt of the second authenticator; and then destroys the second key.

In another aspect, a system for providing secure access to a resource includes a password management agent. The password manager agent detects a user request to access a secure resource. The password manager agent automatically determines that the authenticator associated with the user has been changed following the encryption of a user credential required to access the requested secure resource.

The system also includes a first key used to encrypt the user credential required to access the requested secure resource. The first key is generated from multiple cryptographically strong components and is destroyed after encrypting the user credential. The first key is regenerated following the detection by the password manager agent of the user request to access the secure resource. The system also includes a second key that is used to encrypt the user credential subsequent to the decryption of the user credential using the regenerated key. The second key is also generated from multiple cryptographically strong components and is destroyed after encrypting the user credential.

In a third aspect, an article of manufacture having embodied thereon computer-readable program means for providing access to a secure resource, includes computer-readable program means for receiving a first authenticator for a user and computer-readable program means for encrypting, using a first key, a user credential required for access to the secure resource in response to receipt of the first authenticator. The article of manufacture further includes computer-readable program means for destroying the first key and receiving, subsequent to the destruction of the first key, a second authenticator used to authenticate the user. The article of manufacture additionally includes computer-readable program means for receiving a request from the user to access the secure resource and computer-readable program means for regenerating the first key following validation of the identity of the user. Also, the article of manufacture includes computer-readable program means for decrypting the encrypted user credential using the regenerated first key and then providing the decrypted user credential to the requested resource. The article of manufacture also includes computer-readable program means for, following the decryption of the user credential using the regenerated first key, encrypting the user credential using a second key created following the receipt of the second authenticator; and then destroying the second key.

In a fourth aspect, a method of providing access to a secure resource over a network, includes the step of providing a user credential associated with a user. The user credential is encrypted using a first key and associated with the user following a first authentication of the user to the network using a first authenticator. The first key is destroyed following the encryption of the user credential. The method also includes the step of receiving, subsequent to the first authentication, a request from the user to access a secure resource, the secure resource requiring the encrypted user credential. Additionally the method also determines that the request for the secure resource originated from the user following a second authentication of the user to the network using a second authenticator. Also, the method includes the steps of regenerating, automatically without additional user input, the first key, following validation of the identity of the user and decrypting the encrypted user credential using the regenerated first key. The method additionally provides the decrypted user credential to the secure resource and encrypts the user credential using a second key created following the receipt of the second authenticator. The second key is destroyed following the encryption.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The present invention provides a sliding scale of configurable security options to security administrators seeking to provide transparent key recovery for re-authenticated users while still maintaining security protocols that protect user credentials. Multiple components, each of which may be cryptographically strong, are utilized to generate an encryption key used to encrypt user credentials necessary to access a secure resource. The encryption key components may be stored individually, combined together or combined with other data before being stored. Furthermore the key component or key component combination may also be encrypted and/or hashed before being stored. The illustrative embodiment of the present invention automatically retrieves the encryption key components in order to regenerate the encryption key upon the detection by a password manager agent of a user request to access a secure resource that is submitted by a user that has changed authentication since the credentials were originally encrypted. For example, the password manager agent detects a request by user in a single sign-on system that has reset their password subsequent to the user credential being encrypted. At least one of the stored encryption key components necessary for encryption key regeneration may be made accessible only to the password manager agent.

Following the encryption, the encryption key components are securely stored in multiple locations and the encryption key is destroyed. Once regenerated, the original encryption key is used to decrypt the user credential which is passed to the requested resource. After use, the regenerated encryption key is destroyed and a new encryption key associated with the user's new authentication information is generated and used to encrypt the user credential. The components of the new encryption key are stored and the new encryption key is destroyed.

Figure 2:
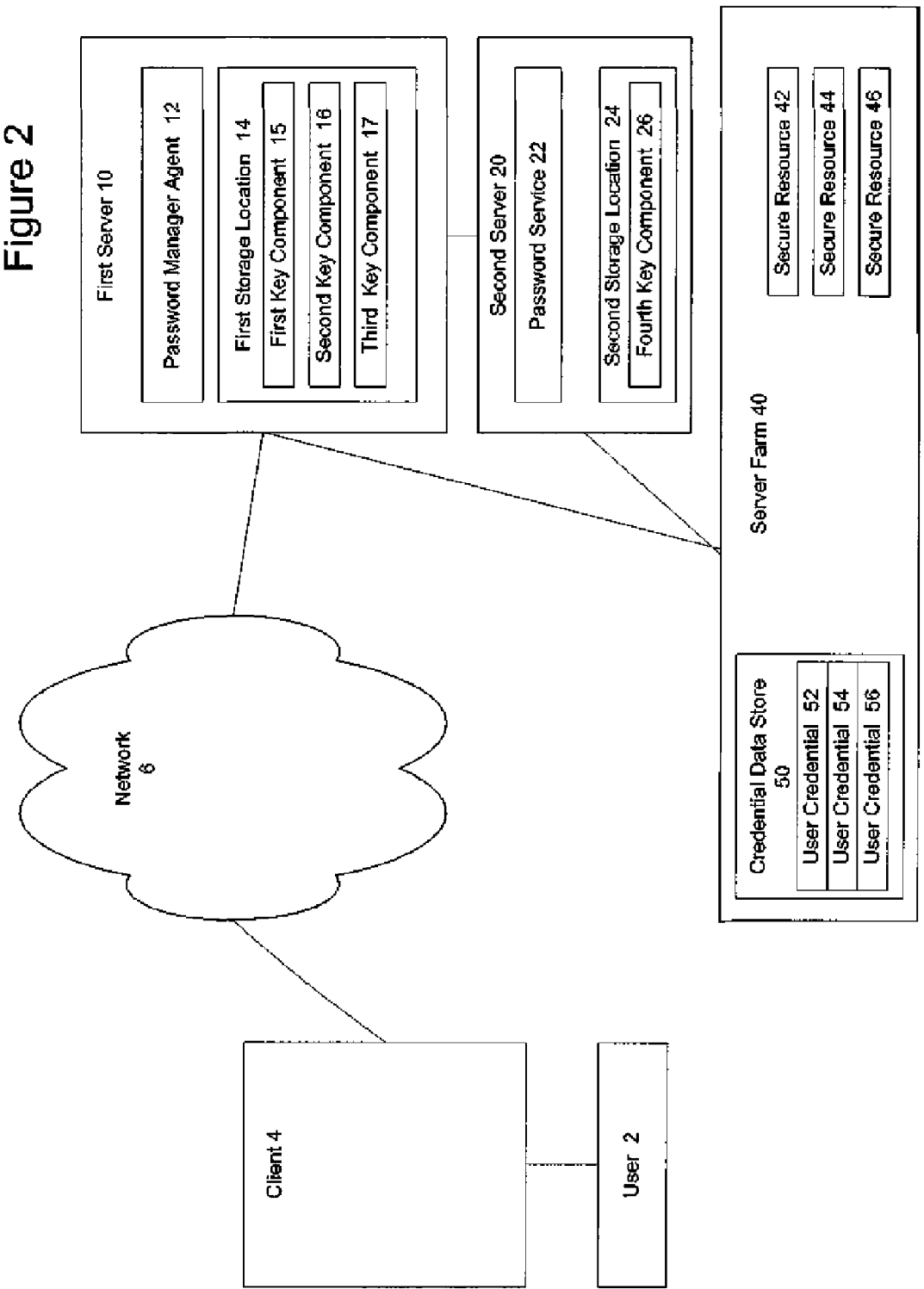
FIG. 2 depicts, in block diagram form, an environment suitable for practicing the illustrative embodiment of the present invention.

FIG. 2 depicts, in block diagram form, an environment suitable for practicing the present invention. A user 2 accessing a client 4 communicates over a network 6 with a first server 10 to request access to a secure resource 42, 44, or 46. The first server 10 includes a password manager agent 12 which intercepts the request for the secure resource 42, 44 or 46. The password manager agent 12 verifies the authentication information submitted by the user 2 to the system/network, and if the user is authorized, begins the process of regenerating a first cryptographic key needed to decrypt a user credential 52, 54 or 56 necessary to allow user access to the secure resource 42, 44 or 46. The encrypted user credentials 52, 54 and 56 may be stored in a credential data store 50 somewhere in a server farm 40 accessible by the password manager agent 12. The secure resources 42, 44, and 46 may also be hosted by the server farm 40.

The password manager agent 12 regenerates the first encryption key necessary to decrypt the user credential 52, 54 or 56 by retrieving and using multiple key components such as first key component 15, second key component 16 and third key component 17 which may be stored in a first storage location 14 on the first server 10. A fourth key component 26 may be stored in a second storage location 24 on a second server 20. The fourth key component may be generated by a password service 22 located on the second server 20. Both the enrollment process during which the first cryptographic key is created, used to encrypt the user credential 52, 54 or 56, the components of the first key are stored, and the assembled key is destroyed, and the process by which the first cryptographic key is regenerated in order to decrypt the user credential, are discussed in detail below.

Examining FIG. 2 in more detail, the network 6 may be a local area network (LAN), a wide area network (WAN), the Internet, an internet, an extranet or some other type of network. Similarly, the network 6 may be a wired network, a wireless network, a fiber-optic network, a satellite network, or a network using some other type of communication medium. The client 4 may communicate over the network 6 using any of a number of different communication protocols.

Figure 3A:
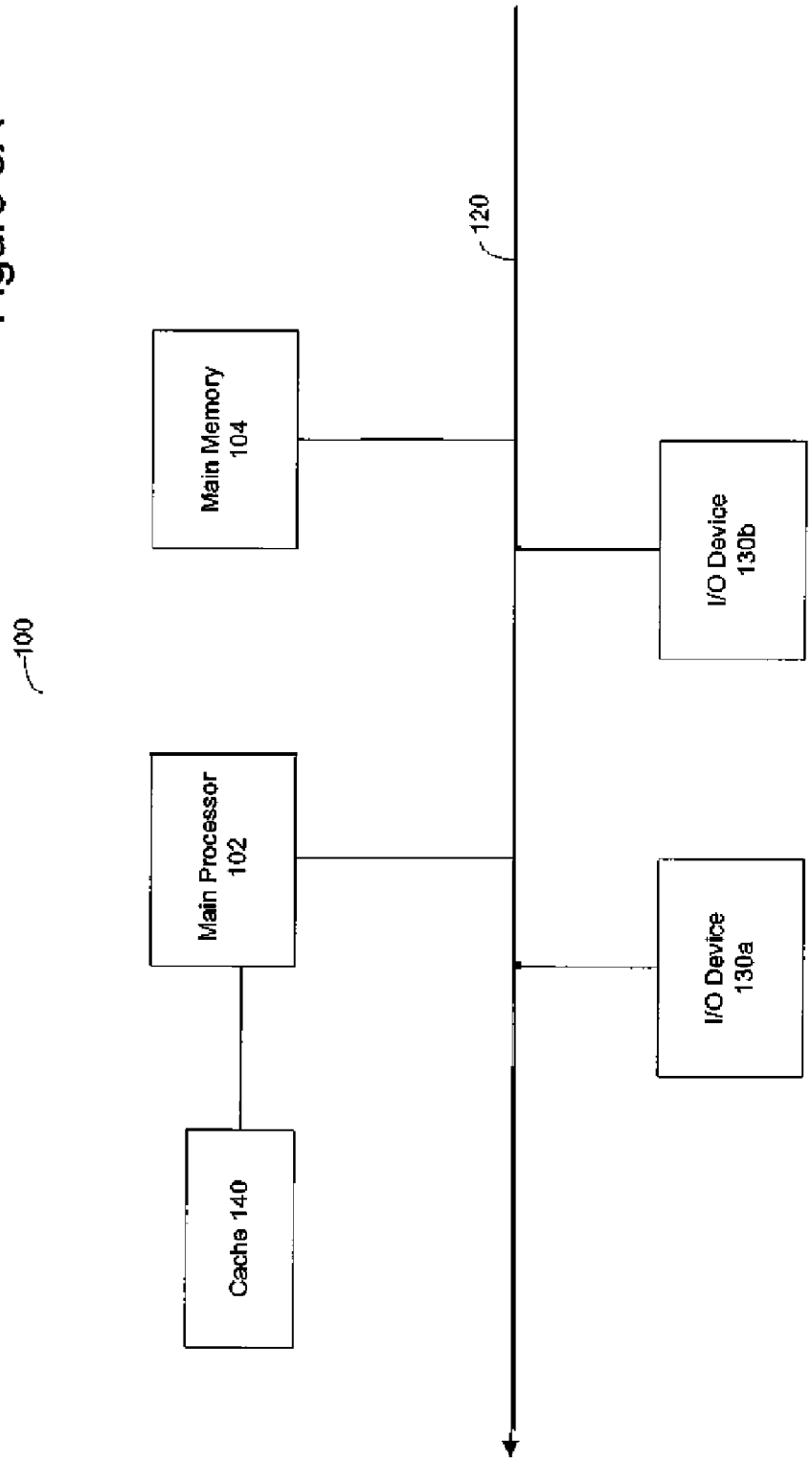
FIG. 3A is a block diagram of a typical computer useful in the present invention.
Figure 3B:
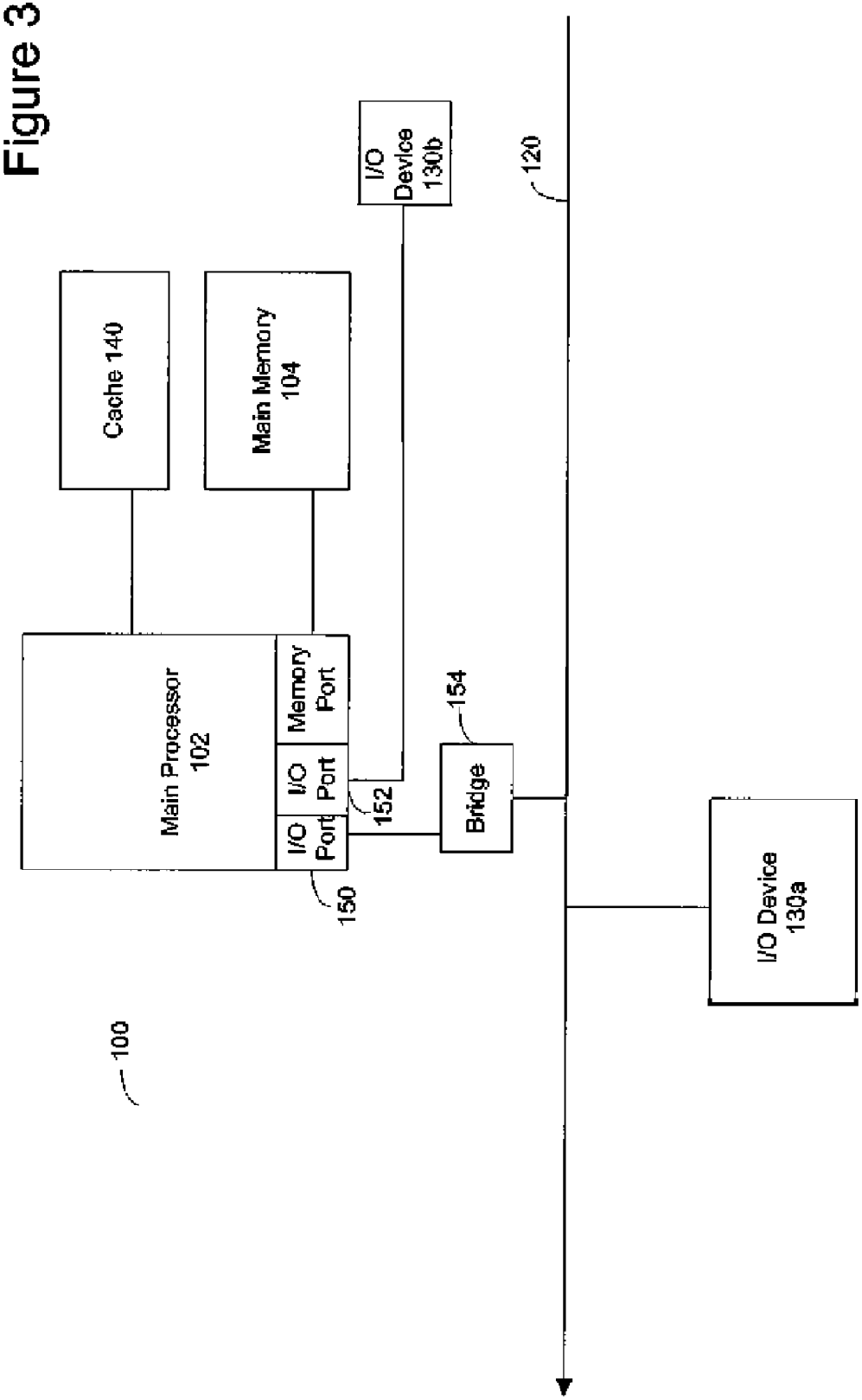
FIG. 3B depicts an embodiment of the computer system in which the processor communicates directly with main memory via a memory port.

In other embodiments, the client 4, the servers in the server farm 40, and the first server 10 and second server 20 are provided as personal computer or computer servers, of the sort manufactured by the Hewlett-Packard Corporation of Palo Alto, Calif. or the Dell Corporation of Round Rock, Tex. FIGS. 3A and 3B depict block diagrams of a typical computer 200 useful as the first or second server 10 and 20, or the client 4 in those embodiments. As shown in FIGS. 3A and 3B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athalon, or the AMD Duron processor, manufactured by Advanced Micro Devices of Sunnyvale, Calif.

In the embodiment shown in FIG. 3A, the processor 202 communicates with main memory 204 via a system bus 220 (described in more detail below). FIG. 3B depicts an embodiment of a computer system 200 in which the processor communicates directly with main memory 204 via a memory port. For example, in FIG. 3B the main memory 204 may be DRDRAM.

FIGS. 3A and 3B depict embodiments in which the main processor 202 communicates directly with cache memory 240 via a secondary bus, sometimes referred to as a "back-side" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 3A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 3B depicts an embodiment of a computer system 200 in which the main processor 202 communicates directly with I/O device 230b via HyperTransport, Rapid I/O, or InfiniBand. FIG. 3B also depicts an embodiment in which local buses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 3A and 3B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

The client 4 may be a computer system or a mobile device such as a PDA or mobile telephone. For embodiments in which the client 4 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client device 4 is mobile, it may be a personal digital assistant (PDA) operating under control of the PalmOS operating system, such as the Tungsten W, the VII, the VIIx, the i705, all of which are manufactured by palmOne, Inc. of Milpitas, California. In further embodiments, the client device 20 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, California, or the Toshiba PocketPC e405, manufactured by Toshiba America, Inc. of New York, N.Y. In still other embodiments the client device is a combination PDA/telephone device such as the Treo 180, Treo 270 or Treo 600, all of which are manufactured by palmOne, Inc. of Milpitas, Calif. In still further embodiment, the client device 4 is a cellular telephone that operates under control of the PocketPC operating system, such as the MPx200, manufactured by Motorola Corp.

The secure resources 42, 44 and 46 may be computer systems, devices, applications, processes, file systems or some other construct requiring the user 2 to submit an authentication credential before allowing the user access to the resource. The encrypted user credentials 52, 54 and 56 may be user credentials associated with a single user for different resources. Alternatively, the user credentials 52, 54 and 56 may each be associated with a different user and represent credentials for multiple resources that have been jointly encrypted. Other possibilities will be apparent to those skilled in the art.

In one implementation, the password manager agent 12 may be a METAFRAME PASSWORD MANAGER agent found in METAFRAME PASSWORD MANAGER from Citrix Systems, Inc. of Fort Lauderdale, Fla. Similarly, in the same or different implementation, the password service 22 may be a METAFRAME PRESENTATION MANAGER service also found in METAFRAME PRESENTATION MANAGER. It should also be noted that the password manager agent may run on a desktop (client 4 in FIG. 2) and still perform SSO (single sign-on) to apps that run on any type of server. In addition, the password manager agent 12 may be installed on a client system and also on a server with the agents dividing the responsibility for performing SSO for hosted applications. In such a case, both agents may use the same credential store and both agents may perform key recovery.

Those skilled in the art will recognize that the first server 10, second server 20, server farm 40 and client 4 are intended to be illustrative and in no way limiting as to the type of architecture that may be deployed to support the present invention. Thus, other devices supporting the functionality described herein may be employed in addition to or in place of the depicted devices without departing from the scope of the present invention. Similarly, it will be appreciated that the components depicted in FIG. 2 such as the password manager agent 12, password service 22, the first and second storage locations 14 and 24, first, second, third and fourth key components 15, 16, 17 and 26, credential data store 50, user credentials 52, 54 and 56 and secure resources 42, 44 and 46 may appear in different locations in different implementations of the present invention and that the functionality of the various depicted components may be combined into fewer components, separated into additional components and/or replaced by other components capable of performing the invention discussed herein without departing from the scope of the present invention.

The illustrative embodiment of the present invention addresses the situation that arises in single sign-on and other systems requiring user credentials for secure resources where a user has changed an authenticator required to logon to a system. The term authenticator as used herein includes user-supplied domain passwords, user IDs, tokens, or smart cards, biometrics, SAML assertions, other types of assertions and any other information provided by a user or on a user's behalf in order to authenticate the user to the network or system hosting the secure resource the user is requesting. As noted above, conventional techniques in a single sign-on system employ a password agent to identify the request and provide a cryptographic key associated with the user's logon information in order to decrypt the required user credential needed for the requested resource. If the logon information has changed, system administrator assistance is required.

Figure 4:
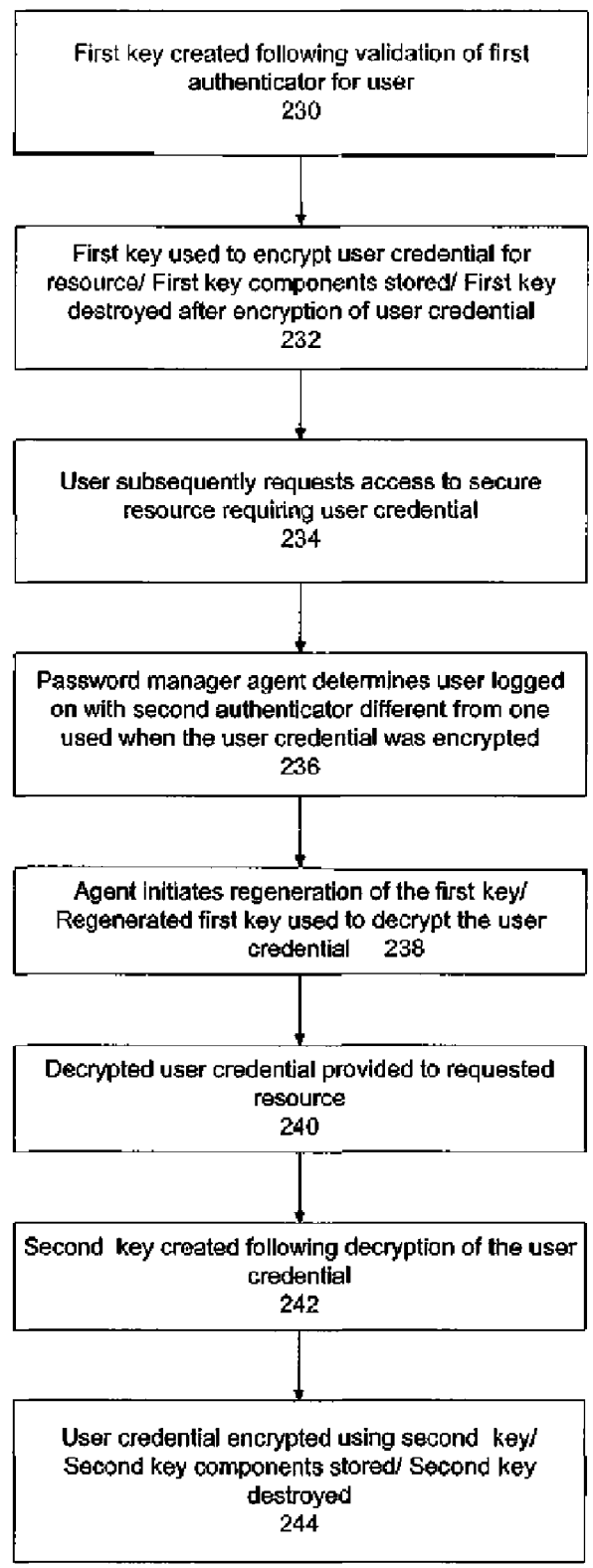
FIG. 4 is a flowchart of the overall sequence of steps followed by the illustrative embodiment of the present invention to regenerate a cryptographic key for a user credential following re-authentication of the user.

Referring now to FIG. 4, the overall sequence of steps followed by an illustrative embodiment of the present invention to perform transparent key recovery is shown. The sequence begins when a first key is created following the validation of the first authenticator provided by the user to the system or network (step 230). The creation and initial use of the first key is discussed in greater detail in FIG. 5 below. The first key is used to encrypt the user credential for a secure resource. The key components are stored in multiple locations in a secure manner. The first key is then destroyed after the encryption of the user credential (step 232).

The overall sequence of steps followed by the present invention continues when the user subsequently requests access for the secure resource that requires the encrypted user credential (step 234). The password manager agent determines that the requesting user logged on to the system or network using a second different authenticator that does not match the authenticator offered for the user at the time of the user credential encryption (step 236). The regenerated first key is then used to decrypt the user credential (step 238). The decrypted user credential is provided to the requested resource (step 240) which then allows the user access. Once the user credential has been encrypted, the first key and the components used to generate the first key are destroyed and a second key is created and associated with the second authenticator most recently submitted by the user (step 242). The second key is then used to encrypt the user credential, the second key components are stored and the second key is destroyed (step 244). The process of regenerating the first key in order to decrypt the user credential required by the secure resource is discussed in greater detail in the discussion of FIG. 6 below.

Still referring to FIG. 4 and in more detail, the regenerated first key is used to decrypt the user credential for the resource (step 238). The first key is also used to reverse the original encryption process (step 204 in FIG. 3). In the original encryption process and in the decryption process, the first key is used as input to a block cipher that operates on the credential. In these embodiments, the block cipher may be AES, RC6, RC5, RC2, DES, Triple-DES, or another block cipher.

It should be noted that at the time of the password manager agent making the determination that the authenticator offered on the user's behalf has changed, the user has already gone through the system or network process required to change authenticators (e.g.: a self-service password reset process or administrator query process) as a pre-requisite for logging on to the system or network. The password manager agent initiates the regeneration of the first key using the multiple saved key components.

Figure 5:
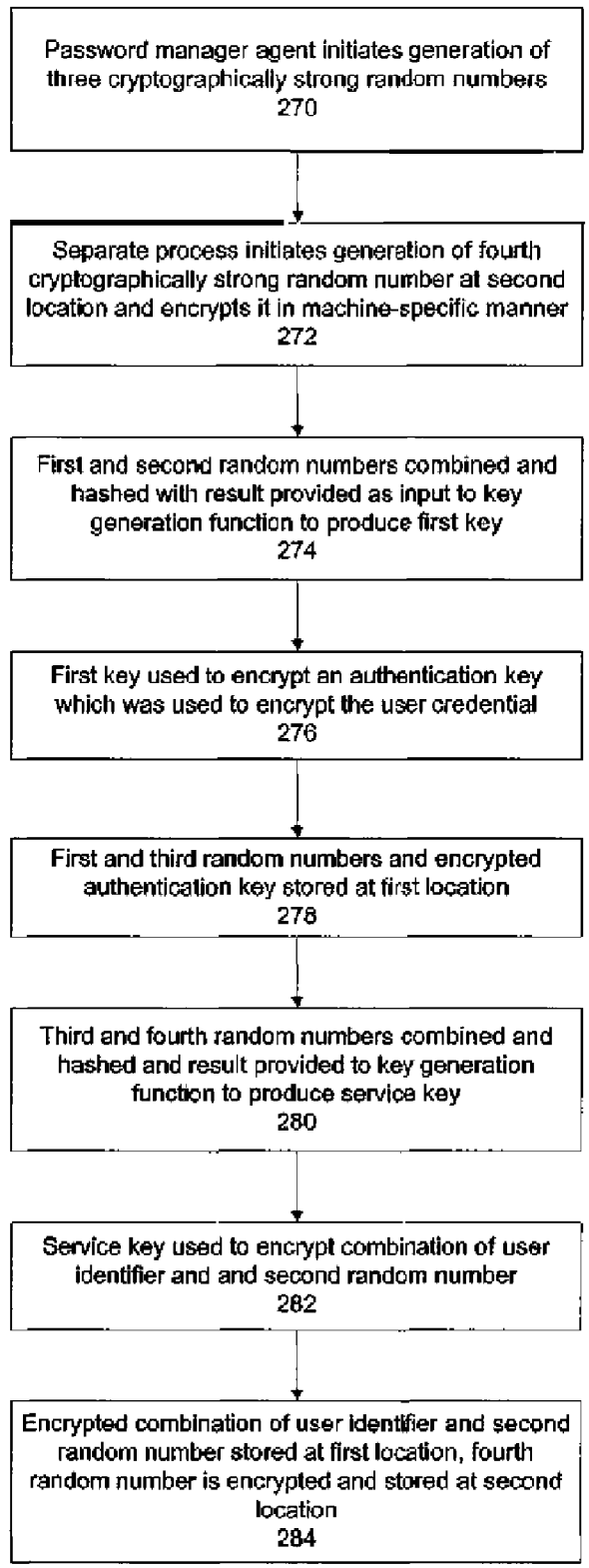
FIG. 5 is a flowchart of the enrollment process followed to enroll a user in the key recovery mechanism.

Those skilled in the art will recognize that exact encryption techniques used to implement the present invention may vary within the scope of the present invention. FIG. 5 depicts one possible sequence of steps that may be utilized by the present invention to generate and use a first key to encrypt a user credential in a manner that allows for the secure regeneration of the key by the password manager agent following detection of a changed user authenticator (step 236 in FIG. 4). The sequence by which the first key is generated and used in one implementation begins with the password manager agent initiating the generation of three random numbers (also referred to herein as key components) (step 270). A separate password service located on a separate physical device generates a fourth random number (step 272). The first and second random numbers are then combined (such as by being concatenated) and hashed with the result provided to a key generation function to produce a first key (step 274). The first key may then be used to encrypt a separately produced cryptographic authentication key which has been used to encrypt the user credential (step 276).

After the encryption of the user credential, the present invention performs additional steps with the key components used to generate the first key in order to store the components securely in the event key generation is required. The first and third random numbers and the encrypted authentication key (which was encrypted with the first key) are stored in a first location (step 278). The third and fourth random numbers are combined (such as by concatenation) (after the fourth random number is decrypted on the same machine on which it was encrypted), hashed and the result provided to a key generation function to produce a service key (step 280). The hashing and key generation functions may be the hash functions and key generation functions discussed above. The service key is then used to encrypt a combination of a user identifier and the second random number (step 282) and the encrypted combination of the user identifier and second random number is stored at the first location while the fourth random number is stored at the second location and encrypted in a machine-specific manner (step 284). The created first key and service key are destroyed to prevent illicit access to the now-encrypted user credential. The present invention thus stores the first, second, third and fourth key components in various altered forms that are inaccessible. The process by which the components are retrieved and used to regenerate the first key is discussed below with regard to FIG. 6.

Still referring to FIG. 5 and in more detail, the password manager agent initiates the generation of three random numbers (step 270). The three random numbers may be 56 bit, 64 bit, 128 bit, 160 bit, 192 bit or some other cryptographically strong random numbers generated by using a function such as the MS-CAPI CryptGenRandom function. A separate password service located on a separate physical device generates a fourth random number (step 272). The fourth random number may be a 56 bit, 64 bit, 128 bit, 160 bit, 192 bit or some other cryptographically strong random number generated using a function such as the MS-CAPI CryptGenRandom function and then encrypted using DPAPI's CryptProtectData and stored on the local hard drive of the machine running the password service. The fourth random number (key component) may only be accessible by the password manager agent. The use of DPAPI makes the encryption of the fourth random number machine-specific and requires the number to be decrypted on the machine where the encryption took place.

Continuing to refer to FIG. 5, the first and second random numbers are combined and hashed with the result provided to a key generation function to produce a first key (step 274). The exact type of hash employed is not critical to the present invention. For example, the hash may be the MD-5 hash, MD-4 hash, the SHA-1 hash, RIPEMD, RIPEMD-160, SHA-2 family hash functions, WHIRLPOOL, or some other type of hash. The key generation function may be CryptDeriveKey. The first key may be used to encrypt a separately produced cryptographic authentication key which has been used to encrypt the user credential (step 276). The encryption may be AES, RC6, RC5, RC2, DES, Triple-DES, Blowfish, CAST-128, Rainbow, SAFER or some other type of encryption. Those skilled in the art will recognize that one or more additional keys may utilized in addition to the authentication key in the encryption of the user credential without departing from the scope of the present invention. For example, the user credential may first be encrypted by a credential key which in turn is encrypted by the authentication key, which in turn is encrypted by the first key. Alternatively the first key may be used to directly encrypt the user credential. Other variations will be apparent to those skilled in the art.

Figure 6:
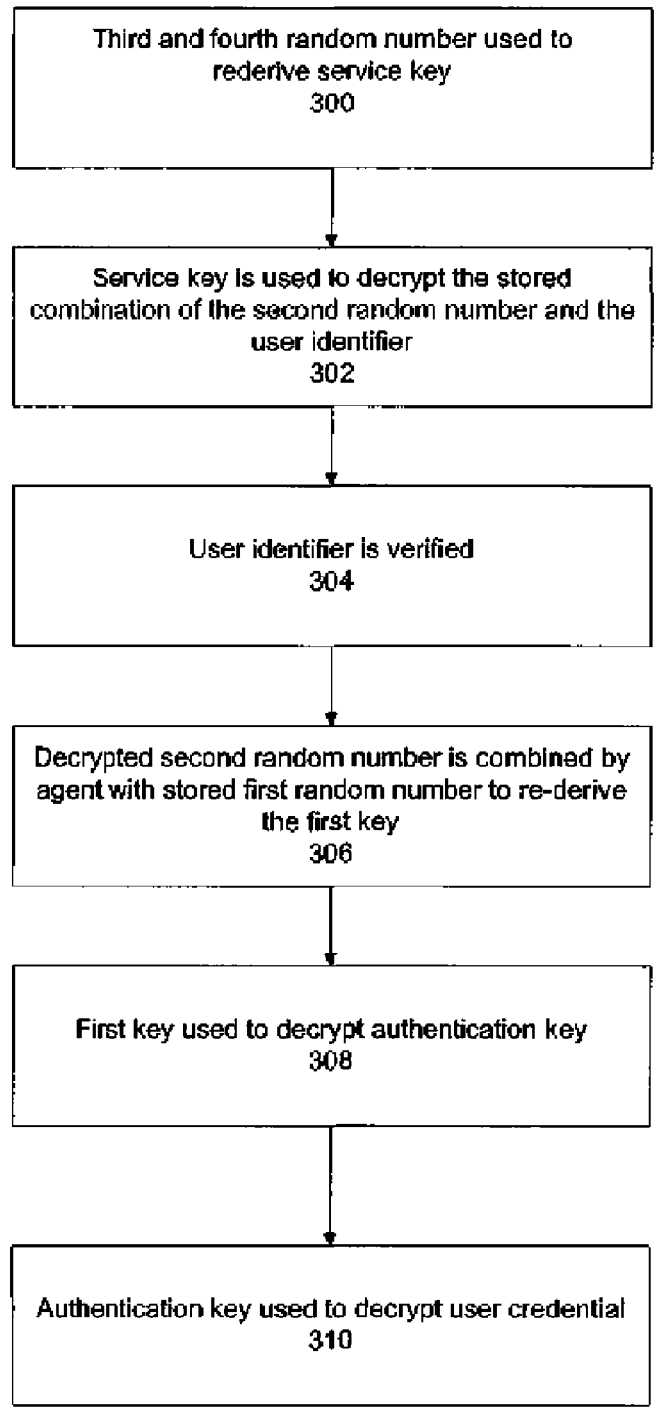
FIG. 6 is a flowchart of the sequence of steps followed by the illustrative embodiment of the present invention to regenerate the key needed to decrypt the user credential following a user's re-authentication by the system.

FIG. 6 depicts a sequence of steps by which the present invention may regenerate the first key using the key components discussed in FIG. 5. It will be appreciated by those skilled in the art that the exact sequence by which the first key is regenerated is highly dependent upon the sequence followed initially to create the first key and store the first key components and the regeneration process will vary accordingly with changes in those processes.

Figure 1:
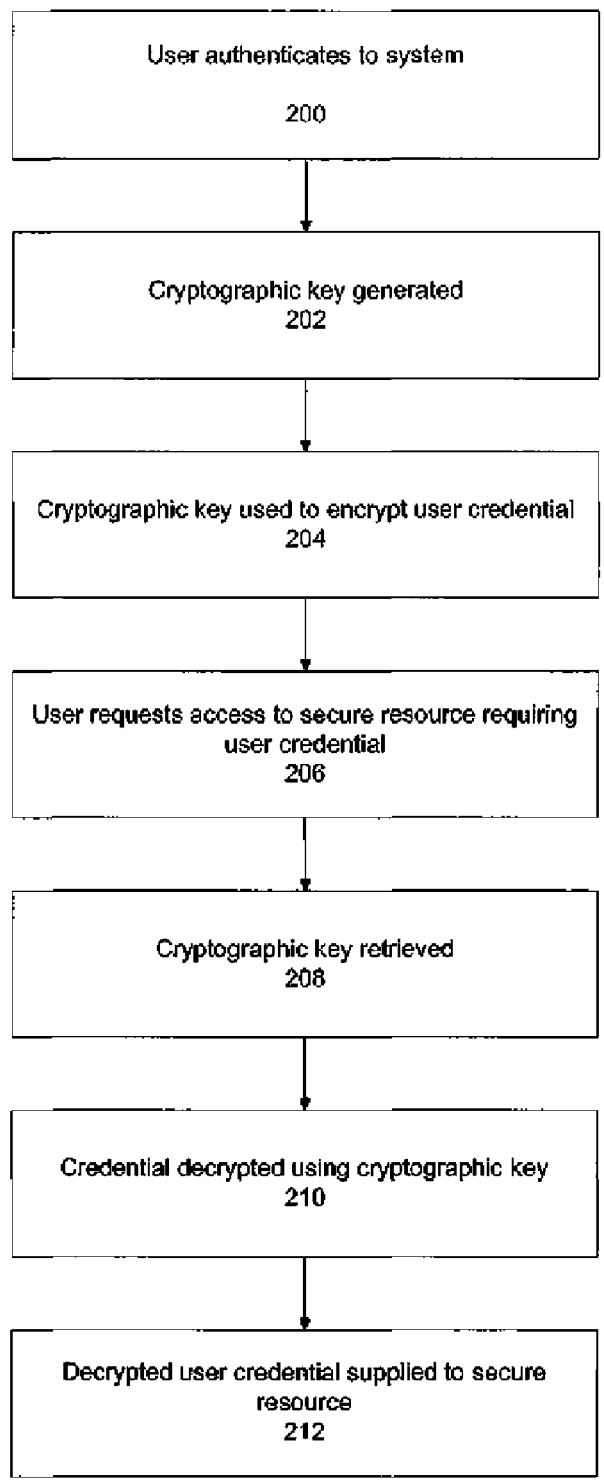
FIG. 1 (prior art) is a flowchart of the sequence of steps conventionally used to retrieve encrypted user credentials.

The first key regeneration sequence begins following the identification by the password manager agent of a request by a user with a changed authenticator to access a secured resource. The password manager agent 12 retrieves the first and third random numbers, and the third random number is sent to password service/server (second server 20 in FIG. 1). The password service 22 uses DPAPI to decrypt the fourth random number. The password service 22 uses the third and forth random numbers to re-derive the service key by combining and hashing them in the same manner as was done during the original key creation, with the result being fed to the same key generation function as originally used in order to re-derive the service key (step 300). Once the service key has been re-derived, it may be used to decrypt the stored combination of the user identifier and the second random number (step 302) and the user identifier can be cross-checked against the requesting user's ID (step 304) as an additional authentication check. The decrypted second random number is sent to the agent and may then be combined by the agent with the stored first random number to duplicate the derivation process for the first key that was described above (step 306). Once the first key has been derived it may be used to decrypt the authentication key (step 308) which may be used to decrypt the user credential (step 310) or the next key in the chain in an alternate implementation. Following the decryption and use of the user credentials, the user credentials are re-encrypted using a new second key generated as discussed above.

Still referring to FIG. 6 and in more detail, the password service 22 uses DPAPI to decrypt the fourth random number. An additional layer of security is provided as only the password manager service/server has access to the fourth random number and the decryption of that random number must be performed on the same machine on which the number was encrypted using DPAPI which is machine-specific. It will be appreciated by those skilled in the art that other cryptographic techniques, such as the use of a hardware cryptographic card may be utilized to encrypt the fourth random number in place of DPAPI. The user identifier may be programmatically cross-checked against the requesting user's ID submitted during the domain logon process. Alternatively, the process of recovering the key may halt while the user is queried for an additional authenticator. In a different implementation the system administrator may be required to take further action. The first key is used to decrypt the authentication key (step 308). The authentication key may be derived from the user's domain password, domain name and other variables.

Figure 7:
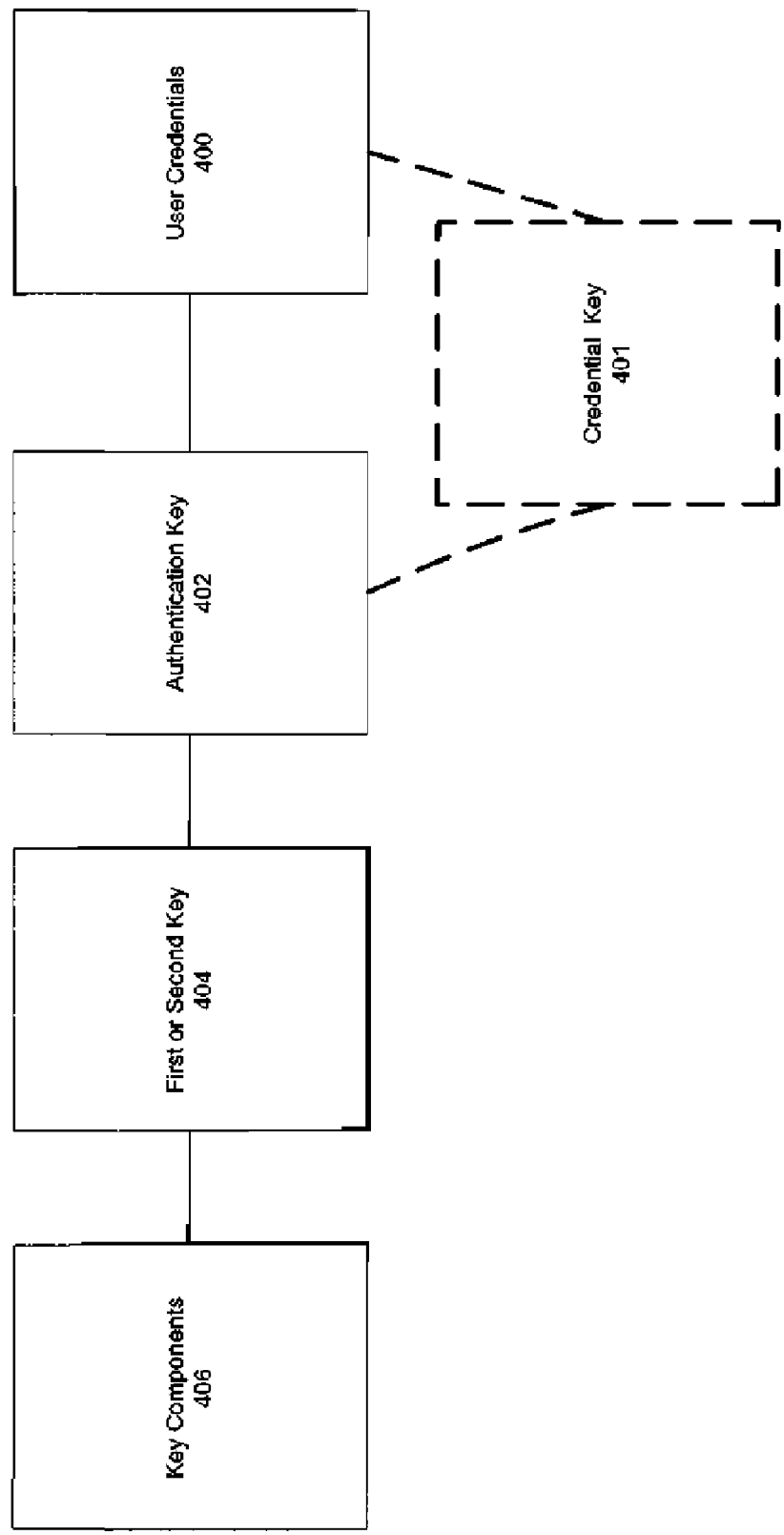
FIG. 7 depicts, in a block diagram form, the layers of encryption utilized by the illustrative embodiment of the present invention.

In order to better understand the mechanisms employed herein, FIG. 7 provides a visual depiction of the encryption chain that may be provided by the illustrative embodiment of the present invention. The user credentials 400 which are required in order to for a user to access a secure resource are encrypted by an authentication key 402. The authentication key is encrypted by the first or second key. The first or second key are generated (or re-generated) using the key components utilized in the manner discussed in FIGS. 4, 5 and 6 above. In alternate implementations, the authentication key 402 may be used to encrypt a credential key 401 (shown in phantom view) which is then used to encrypt the user credentials 400. The use of additional keys beyond those shown here to encrypt the user credential is specifically contemplated as being within the scope of the present invention as is the use of the first or second key 404 to directly encrypt the user credentials.

It will be appreciated that other hashing and key derivation functions and encryption mechanisms in addition to, or instead of, those discussed above may be employed by the present invention. Similarly, it should be noted that the number of key components is not limited to the four randomly generated numbers discussed in FIGS. 5 and 6 but rather may be a lesser or greater number or a different type of data that is capable of being provided as input to the type of encrypting/hashing/key derivation mechanisms discussed herein. Likewise, the storage location of the first and second key components may vary from implementation to implementation without departing from the scope of the present invention.

In addition to the transparent key recovery mechanism discussed above, additional layers of security are also possible in the present invention. In an alternate implementation, following the detection of the request for the secure resource by the password manager agent that originated from a user logged on with a changed (second) authenticator, the password manager agent may query the user for a third authenticator before beginning the key recovery process. In another implementation, the password manager agent may require a system administrator to submit a third authenticator before beginning the key recovery process. For example, the administrator may be required to adjust a permission setting in a server. In a different implementation, the password manager agent may require the user to submit a third authenticator and the system administrator to submit a fourth authenticator prior to beginning the key recovery process. Additionally any or all of these implementations may also require the password manager agent to check user permission levels for the requested secure resource.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention. Similarly, data structures other than the ones mentioned herein may be used to hold data without departing from the scope of the present invention.

What is claimed as new and desired to be protected by Letters Patent of the United States is:

1. A method of providing access to a resource on a server, the method comprising:
    receiving, by a password manager agent executing on a server, a first authenticator for a user;
    encrypting, by the password manager agent using a first key, in response to receipt of the first authenticator, a user credential required for access to at least one resource;
    destroying the first key;
    receiving, by the password manager agent subsequent to the destruction of the first key, a second authenticator used to authenticate the user;
    receiving, by the server, a request from the user to access the at least one resource;
    regenerating, by the password manager agent, the first key following validation of the identity of the user;
    decrypting the encrypted user credential using the regenerated first key;
    providing the decrypted user credential to the at least one resource;
    encrypting the user credential using a second key created following the receipt of the second authenticator; and
    destroying the second key.

2. The method of claim 1, further comprising: wherein the first authenticator and the second authenticator are at least one of the group of user-supplied domain passwords, tokens, or smart cards, biometrics, SAML assertions and assertions.

3. The method of claim 1, comprising the further step of: receiving a third authenticator from a user prior to the regeneration of the first key.

4. The method of claim 1, comprising the further step of: receiving a third authenticator from an administrator prior to the regeneration of the first key.

5. The method of claim 1, comprising the further step of: receiving a third authenticator from a user; and receiving a fourth authenticator from an administrator, the third authenticator and the fourth authenticator received prior to the regeneration of the first key.

6. The method of claim 1 wherein the first key used to encrypt the user credential is generated from a plurality of components which are stored in separate locations prior to the first key being regenerated.

7. The method of claim 6 wherein at least some of the components stored in separate locations are retrieved and used to regenerate the first key following the validation of the identity of the user.

8. The method of claim 1, further comprising: destroying the regenerated first key after using the first key to decrypt the encrypted user credential.

9. The method of claim 1 wherein the first key is used to encrypt an authentication key which is used to encrypt the user credential.

10. The method of claim 9 wherein the authentication key is used to encrypt a credential key which is used to encrypt the user credential.

11. The method of claim 1 wherein the first key is created using a plurality of cryptographically strong random numbers generated from a first source.

12. The method of claim 11 wherein the key is created using a cryptographically strong random number generated from a second source.

13. The method of claim 11 wherein at least two of the plurality of cryptographically strong random numbers are combined and hashed as part of the creation of the key.

14. The method of claim 11 wherein at least one of the plurality of cryptographically strong random numbers used to create the key is encrypted prior to being stored in a separate location from the rest of the plurality of cryptographically strong random numbers.

15. The method of claim 1 wherein the resource is an application.

16. A system for providing secure access to a resource on a server, comprising:
a password management agent executing on a server, the password manager agent detecting a user request to access a secure resource from a user and determining the authenticator associated with the user has changed subsequent to the encryption of a user credential required to access the requested secure resource;
a first key used to encrypt the user credential required to access the requested secure resource, the first key generated from a plurality of cryptographically strong components, destroyed after encrypting the user credential, and regenerated following the detection by the password manager agent of the user request; and
a second key used to encrypt the user credential subsequent to the decryption of the user credential using the regenerated key, the second key generated from a plurality of cryptographically strong components and destroyed after encrypting the user credential.

17. The system of claim 16 wherein the secure resource is an application.

18. The system of claim 16 wherein the plurality of cryptographically strong components are cryptographically strong random numbers generated by at least two separate processes.

19. The system of claim 18 wherein at least two of the plurality of cryptographically strong random numbers are stored on physically separate devices following the generation of the first and second key.

20. The system of claim 18 wherein at least two of the plurality of cryptographically strong random numbers are stored on logically separate devices following the generation of the first and second key.

21. The system of claim 18 wherein at least two of the plurality of cryptographically strong random numbers are combined and hashed and a result of the hash is used to generate the first or second encryption key.

22. The system of claim 16 wherein at least part of the first or second authenticator is used to generate the first or second encryption key.

23. An article of manufacture having embodied thereon computer-readable program means for providing access to a secure resource on the server, the article of manufacture comprising:
computer-readable program means for receiving, by a password manager agent executing on a server, a first authenticator for a user;
computer-readable program means for encrypting, by the password manager agent using a first key, in response to receipt of the first authenticator, a user credential required for access to at least one resource;
computer-readable program means for destroying the first key;
computer-readable program means for receiving, by the password manager agent subsequent to the destruction of the first key, a second authenticator used to authenticate the user;
computer-readable program means for receiving, by the server, a request from the user to access the at least one resource;
computer-readable program means for regenerating, by the password manager agent, the first key following validation of the identity of the user;
computer-readable program means for decrypting the encrypted user credential using the regenerated first key;
computer-readable program means for providing the decrypted user credential to the at least one resource;
computer-readable program means for encrypting the user credential using a second key created following the receipt of the second authenticator; and
computer-readable program means for destroying the second key.

24. The article of manufacture of claim 23 wherein the first authenticator and the second authenticator are at least one of the group of user-supplied domain passwords, tokens, or smart cards, biometrics, SAML assertions and assertions.

25. The article of manufacture of claim 23, comprising further: computer-readable program means for receiving a third authenticator from a user prior to the regeneration of the first key.

26. The article of manufacture of claim 23, comprising further: computer-readable program means for receiving a third authenticator from an administrator prior to the regeneration of the first key.

27. The article of manufacture of claim 23, comprising further: computer-readable program means for receiving a third authenticator from a user; and computer-readable program means for receiving a fourth authenticator from an administrator, the third authenticator and the fourth authenticator received prior to the regeneration of the first key.

28. The article of manufacture of claim 23 wherein the first key used to encrypt the user credential is generated from a plurality of components which are stored in separate locations prior to the first key being regenerated.

29. The article of manufacture of claim 28 wherein at least some of the components stored in separate locations are retrieved and used to regenerate the first key following the validation of the identity of the user.

30. The article of manufacture of claim 23 wherein the first key is created using a plurality of cryptographically strong random numbers generated from a first source.

31. The article of manufacture of claim 23 wherein the key is created using a cryptographically strong random number generated from a second source.

32. The article of manufacture of claim 30 wherein at least two of the plurality of cryptographically strong random numbers are combined and hashed as part of the creation of the key.

* * * * *